US011796046B2

(12) United States Patent
Steiger

(10) Patent No.: US 11,796,046 B2
(45) Date of Patent: Oct. 24, 2023

(54) ISOLATED DRIVE ASSEMBLY WITH AN ISOLATOR ASSEMBLY AND A TORQUE LIMITER FOR LIMITING THE TRANSMISSION OF TORQUE THROUGH AN ELASTOMERIC ELEMENT OF THE ISOLATOR ASSEMBLY

(71) Applicant: American Axle & Manufacturing, Inc., Detroit, MI (US)

(72) Inventor: Andreas Steiger, Luetzelbach (DE)

(73) Assignee: American Axle & Manufacturing, Inc., Detroit, MI (US)

(*) Notice: Subject to any disclaimer, the term of this patent is extended or adjusted under 35 U.S.C. 154(b) by 4 days.

(21) Appl. No.: 17/568,829

(22) Filed: Jan. 5, 2022

(65) Prior Publication Data

US 2022/0221040 A1    Jul. 14, 2022

Related U.S. Application Data

(60) Provisional application No. 63/134,992, filed on Jan. 8, 2021.

(51) Int. Cl.
*F16H 55/36* (2006.01)
*F16D 7/04* (2006.01)
*F16H 7/02* (2006.01)

(52) U.S. Cl.
CPC ............. *F16H 55/36* (2013.01); *F16D 7/044* (2013.01); *F16H 7/02* (2013.01); *F16H 2055/366* (2013.01)

(58) Field of Classification Search
CPC ...... F16H 2055/366; F16H 55/36; F16H 7/02; F16D 7/044

USPC .......................................................... 474/94
See application file for complete search history.

(56) References Cited

U.S. PATENT DOCUMENTS

| 2,674,897 | A | * | 4/1954 | Heinish | F16H 55/50 474/94 |
| 5,405,296 | A | * | 4/1995 | Cerny | F16F 15/1442 474/135 |
| RE35,932 | E | * | 10/1998 | Cerny | F16F 15/126 474/166 |
| 5,988,015 | A | * | 11/1999 | Riu | F16H 55/36 74/574.2 |
| 6,106,421 | A | * | 8/2000 | Graber | F16H 55/36 474/94 |
| 7,025,680 | B2 | * | 4/2006 | Tabuchi | F16F 15/10 474/70 |
| 7,204,772 | B2 | * | 4/2007 | Huber | F16H 55/36 474/94 |

(Continued)

FOREIGN PATENT DOCUMENTS

JP    2004316882 A    11/2004
JP    2008025723 A    2/2008

*Primary Examiner* — Henry Y Liu
(74) *Attorney, Agent, or Firm* — Reising Ethington P.C.

(57) ABSTRACT

An isolated drive assembly that includes a drive member, which is rotatable about a rotational axis, a drive member hub, which is rotatable about the rotational axis relative to the drive member, an isolator assembly, which has an elastomeric element that transmits rotary power between the drive member and the drive member hub, and a torque limiter. The torque limiter has first and second sets of engagable limiter elements that limit rotation of the drive member relative to the drive member hub in opposite rotational directions to limit a magnitude of a moment that is transmitted through the elastomeric element.

17 Claims, 4 Drawing Sheets

(56) References Cited

U.S. PATENT DOCUMENTS

| | | | | |
|---|---|---|---|---|
| 7,850,557 B2* | 12/2010 | Moriya | | F16H 55/36 474/902 |
| 7,985,150 B2* | 7/2011 | Kamdem | | F16D 3/02 474/166 |
| 8,021,253 B2* | 9/2011 | Dell | | F16H 7/00 464/57 |
| 8,262,520 B2* | 9/2012 | Shimamura | | F16D 3/12 474/94 |
| 9,291,253 B1* | 3/2016 | Serkh | | F16D 3/12 |
| 9,581,233 B2* | 2/2017 | Manzoor | | F16F 15/1442 |
| 10,030,757 B2* | 7/2018 | Manzoor | | F16H 55/36 |
| 10,151,379 B2* | 12/2018 | Manzoor | | F16H 55/36 |
| 10,267,405 B2* | 4/2019 | Dell | | B60K 25/02 |
| 10,697,531 B2* | 6/2020 | Wick | | F16H 55/36 |
| 11,326,648 B2* | 5/2022 | Faria | | F16D 3/12 |
| 11,434,988 B2* | 9/2022 | Wade | | F16H 55/40 |
| 2006/0172832 A1* | 8/2006 | Watanabe | | F16F 15/126 474/94 |
| 2006/0264282 A1* | 11/2006 | Moriya | | F16H 55/36 474/94 |
| 2008/0034918 A1* | 2/2008 | Manzoor | | F16F 7/108 74/574.4 |
| 2009/0176583 A1* | 7/2009 | Dell | | F02N 11/04 464/40 |
| 2010/0120544 A1 | 5/2010 | Mehlan. et al. | | |
| 2010/0255943 A1* | 10/2010 | Cali | | F16D 3/68 474/94 |
| 2012/0094791 A1* | 4/2012 | Lee | | F16H 55/36 474/94 |
| 2012/0172163 A1* | 7/2012 | Fitz | | F16H 55/36 474/94 |
| 2013/0062155 A1* | 3/2013 | Varin | | F16F 15/1213 192/41 S |
| 2015/0354689 A1* | 12/2015 | Manzoor | | F16F 15/1209 474/94 |
| 2016/0003342 A1* | 1/2016 | Manzoor | | F16H 55/36 474/94 |
| 2016/0102730 A1* | 4/2016 | Manzoor | | F16F 15/126 464/99 |
| 2016/0146328 A1* | 5/2016 | Dell | | B60K 25/02 474/94 |
| 2016/0153519 A1* | 6/2016 | Yoon | | F16H 7/02 474/94 |
| 2016/0195182 A1* | 7/2016 | Cariccia | | F16H 55/36 474/94 |

\* cited by examiner

ISOLATED DRIVE ASSEMBLY WITH AN ISOLATOR ASSEMBLY AND A TORQUE LIMITER FOR LIMITING THE TRANSMISSION OF TORQUE THROUGH AN ELASTOMERIC ELEMENT OF THE ISOLATOR ASSEMBLY

CROSS-REFERENCE TO RELATED APPLICATIONS

This application claims the benefit of U.S. Provisional Application No. 63/134,992 filed Jan. 8, 2021, the disclosure of which is incorporated by reference as if fully set forth in detail herein.

FIELD

The present disclosure relates to an isolated drive assembly that is configured to transmit power through rotary drive, such as a belt or chain, or through a plurality of meshing teeth. The isolated drive assembly includes an isolator assembly and a torque limiter that is configured to limit the transmission of torque through a resilient element of the isolator assembly.

BACKGROUND

This section provides background information related to the present disclosure which is not necessarily prior art.

Modern automotive vehicles that utilize an internal combustion engine to provide propulsive power will typically have a front engine accessory drive (FEAD) that transmits power through a belt from a crankshaft of the internal combustion engine to a plurality of engine accessories, such as a water pump, an air conditioning compressor and an alternator. The FEAD will commonly include a pulley assembly that is mounted on the crankshaft and which is configured to attenuate or soften spikes in the magnitude of the power that is transmitted through the pulley (i.e., between the belt and the engine crankshaft). In general, these spikes are generated by irregularities in the operation of the engine (i.e., the firing of the engine cylinders).

One method for attenuating spikes in the transmission of power between the pulley and the belt involves a mechanical decoupler that employs one or more helical compression springs and a clutch to permit decoupling of the crankshaft of the engine from the pulley. These devices are relatively complex and can be relatively heavy. Moreover, the clutching components introduce additional potential failure modes into the FEAD and there may be concerns as to whether the device would "fail safe" so that rotary power would be transmitted between the engine crankshaft and the belt regardless of the manner in which the clutch may fail.

Another common technique is to segregate the pulley into a pulley component, which is engagable to the belt of the FEAD, and a hub component, which is rotationally coupled to the engine crankshaft, and to employ an elastomeric spring to rotationally couple the pulley component and the hub component in a manner that provides the ability to store or release torque to attenuate torque spikes. It is fairly common for the elastomeric spring to be formed of an ethylene propylene diene monomer (EPDM) rubber material. While elastomeric springs are an effective means for attenuating spikes in the transmission of power between the pulley and the belt, this configuration is susceptible to improvement.

SUMMARY

This section provides a general summary of the disclosure, and is not a comprehensive disclosure of its full scope or all of its features.

In one form, the present disclosure provides an isolated drive assembly that includes a drive member, a drive member hub, and an isolator assembly. The drive member is rotatable about a rotational axis and defines a drive member hub aperture. The drive member hub is received in the drive member hub aperture and is rotatable about the rotational axis relative to the drive member. The isolator assembly has an isolator hub, an isolator rim and an elastomeric element. The isolator hub is coupled to the drive member hub for rotation therewith about the rotational axis. The isolator rim is coupled to the drive member for rotation therewith about the rotational axis. The elastomeric element resiliently couples the isolator hub and the isolator rim. One of the drive member and the drive member hub defines a plurality of circumferentially spaced apart teeth. Each of the teeth has first and second tooth faces. The other one of the drive member and the drive member hub defines a plurality of grooves. Each of the grooves is at least partly delimited on their opposite circumferential ends by first and second sidewalls formed on the other one of the drive member and the drive member hub. Each of the teeth is disposed in an associated one of the grooves and is located within the associated one of the grooves at an initial position when no torque is transmitted between the isolator assembly and the drive member. Contact between the first tooth faces of the teeth and the first sidewalls limits rotation of the drive member relative to the drive member hub away from the initial position in a first rotational direction. Contact between the second tooth faces of the teeth and the second sidewalls limits rotation of the drive member relative to the drive member hub away from the initial position in a second rotational direction that is opposite the first rotational direction.

In another form, the present disclosure provides an isolated drive assembly that includes a drive member, a drive member hub, an isolator assembly, and a torque limiter. The drive member is rotatable about a rotational axis and has a drive member hub aperture. The drive member hub is received in the drive member hub aperture and is rotatable about the rotational axis relative to the drive member. The isolator assembly has an isolator hub, an isolator rim and a silicone rubber element. The isolator hub is coupled to the drive member hub for rotation therewith about the rotational axis. The isolator rim is coupled to the drive member for rotation therewith about the rotational axis. The silicone rubber element resiliently couples the isolator hub and the isolator rim. The torque limiter has a first limiter element, which is coupled to the drive member for rotation therewith, and a second limiter element that is coupled to the drive member hub for rotation therewith. Relative rotation between the drive member and the drive member hub in a first rotational direction in response to transmission of a moment between the drive member and the drive member hub in the first rotational direction that is greater than or equal to a first predetermined magnitude is limited by contact between a first portion of the first limiter element and a first portion of the second limiter element when a first moment is transmitted. Relative rotation between the drive member and the drive member hub in a second, opposite rotational direction in response to transmission of a moment between the drive member and the drive member hub in the second rotational direction that is greater than or equal to a second predetermined magnitude is limited by contact between a second portion of the first limiter element and a second portion of the second limiter element. The first and second limiter elements are not in contact with one another when rotary power is not transmitted through the silicone rubber element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
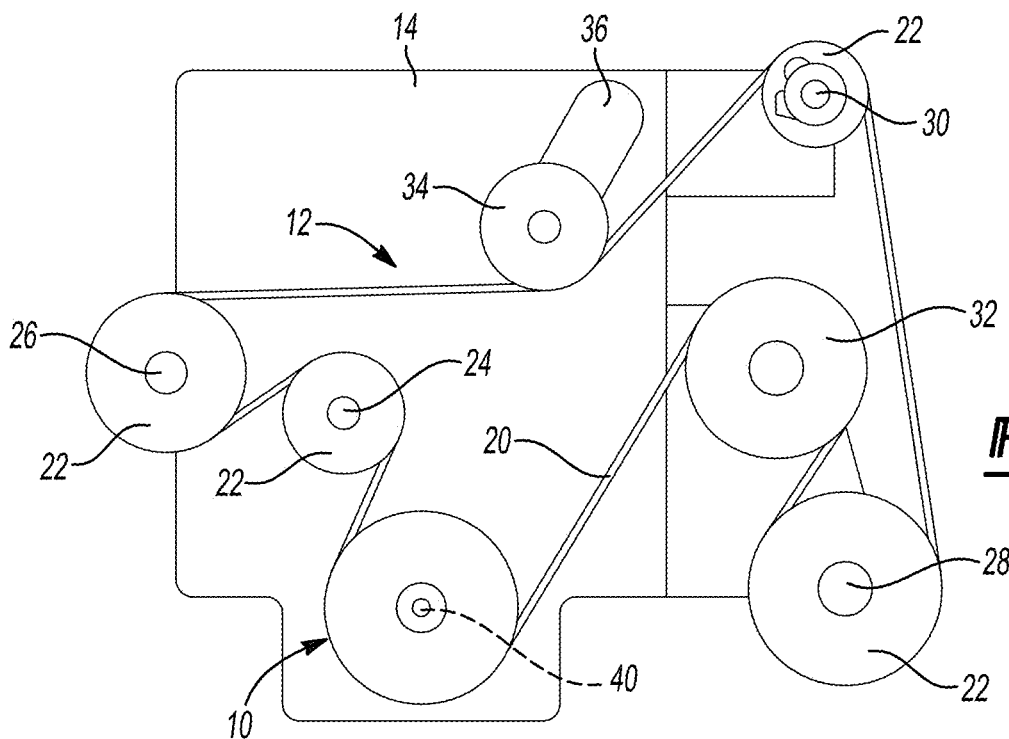
FIG. 1 is a schematic illustration of an exemplary isolated drive assembly constructed in accordance with the teachings of the present disclosure, the isolated drive assembly being shown in the environment of a front engine accessory drive that is powered by an internal combustion engine.
Figure 2:
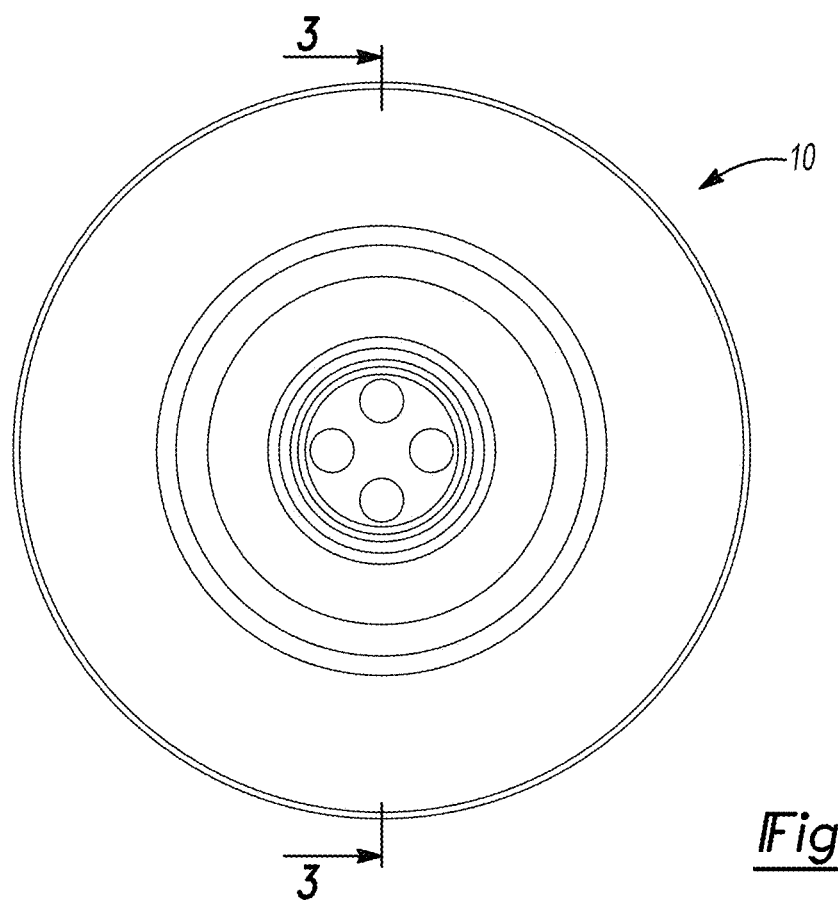
FIG. 2 is a front view of the isolated drive assembly of FIG. 1.

With reference to FIGS. 1 and 2 of the drawings, an exemplary isolated drive assembly constructed in accordance with the teachings of the present disclosure is generally indicated by reference numeral 10. The isolated drive assembly 10 is schematically illustrated in FIG. 1 in operative association with a front engine accessory drive (FEAD) 12 that is powered by an internal combustion engine 14. The FEAD 12 further includes a drive belt 20 and a plurality of pulleys 22 that can be associated with various engine accessories (e.g., a water pump 24, a power steering pump 26, an air conditioning compressor 28, and an alternator 30), an idler pulley 32, and/or a pulley 34 of a belt tensioner 36. The isolated drive assembly 10, which is rotatably coupled to a crankshaft 16 of the internal combustion engine 14 to receive power therefrom, transmits power between the crankshaft 40 and the pulleys 22 of the various engine accessories.

The isolated drive assembly 10 is configured to attenuate the fluctuations in torque that are produced by the internal combustion engine 14 during its operation and which would otherwise be transmitted through the crankshaft 40 to the FEAD 12 in an instantaneous manner if a conventional (solid) pulley were to be employed in the FEAD 12 instead of the isolated drive assembly 10. As such, it will be appreciated that the isolated drive assembly 10 is configured to provide some isolation of the accessories that are driven by the FEAD 12 from torsional fluctuations caused by the operation of the internal combustion engine 14 and that the isolated drive assembly 10 is a type of torsional isolator. Moreover, because the isolated drive assembly 10 attenuates the transmission of torque spikes from the crankshaft 14 to the accessories that are driven by the FEAD 12, the isolated drive assembly 10 is a type of torque filter that is that is similar to a "low pass filter".

It will be appreciated that while the isolated drive assembly 10 is illustrated and described as being configured for use in a system between a shaft (i.e., the crankshaft 40) and a drive belt 20, the teachings of the present disclosure have broader application. In this regard, an isolated drive assembly constructed with the teachings of the present disclosure could be employed to transmit power in a system where power is transmitted between a sprocket and a chain, in a system where power is transmitted between meshing gears, or in a system where power is transmitted between shafts, for example.

Figure 3:
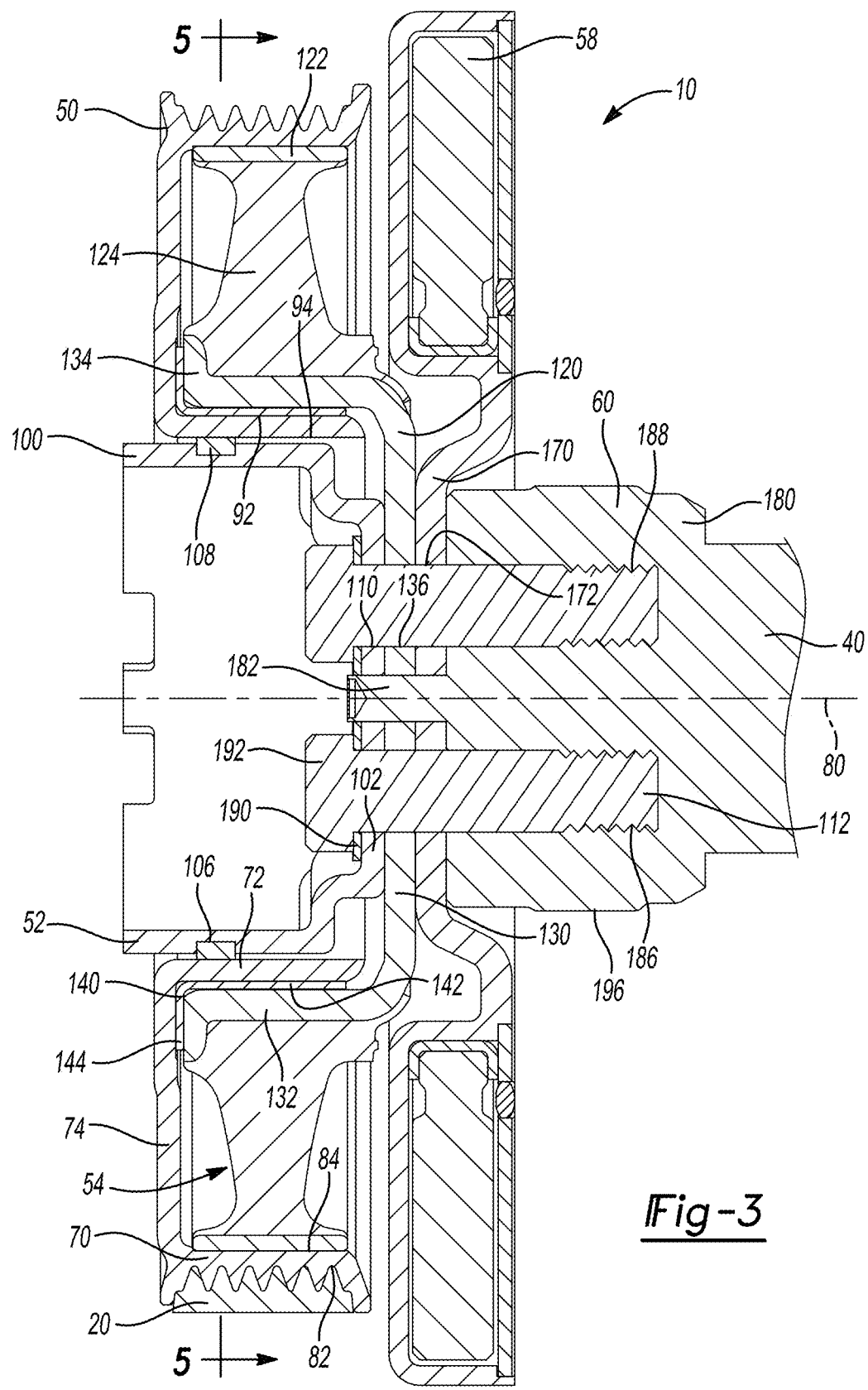
FIG. 3 is a section view taken along the line 3-3 of FIG. 2.
Figure 4:
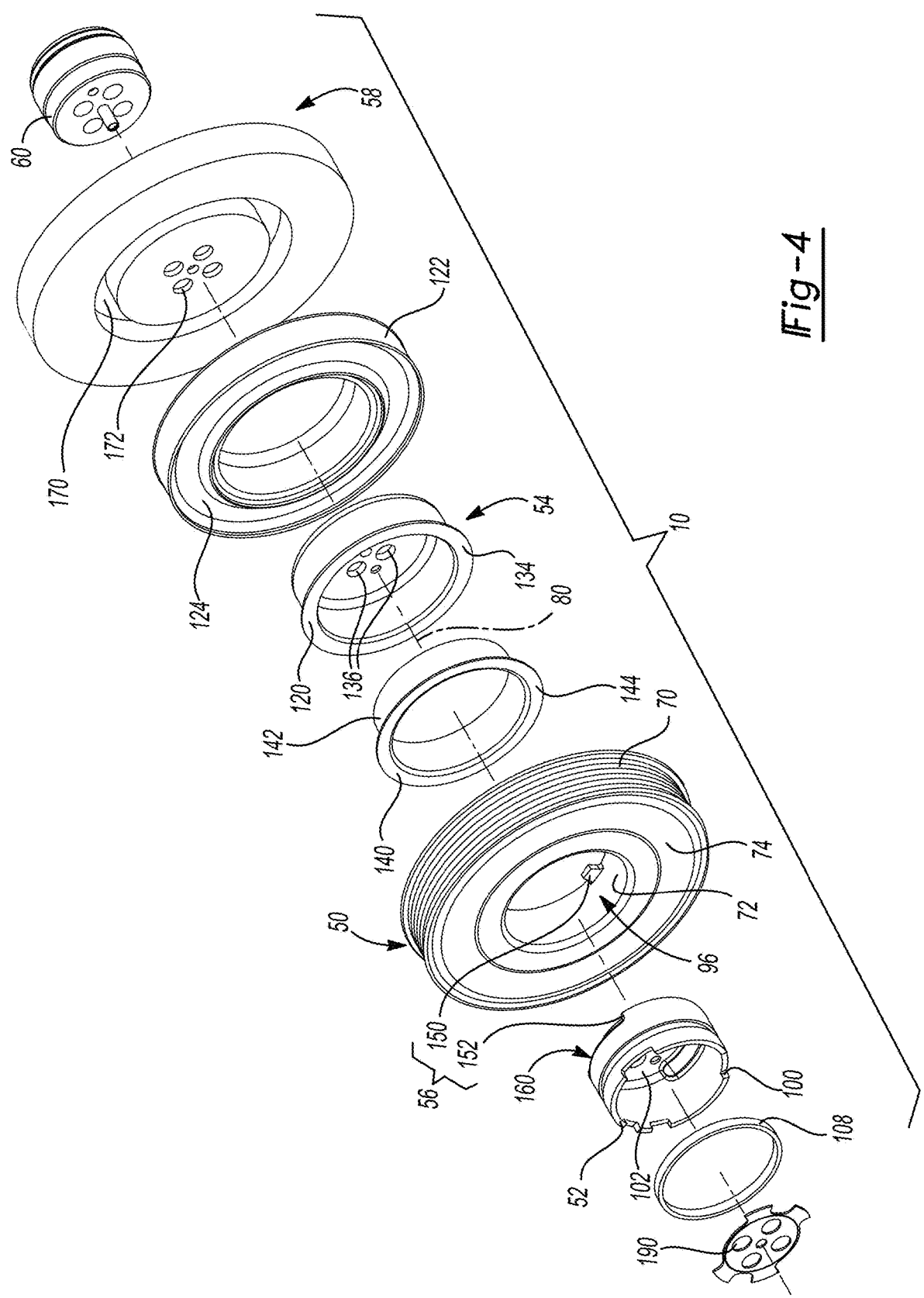
FIG. 4 is an exploded perspective view of the isolated drive assembly of FIG. 1.

With reference to FIGS. 3 and 4, the isolated drive assembly 10 can include a drive member 50, a drive member hub 52, an isolator assembly 54 and a torque limiter 56. In the example provided, the isolated drive assembly 10 further includes a torsional vibration damper 58 and a seal flange 60, both of which are optional.

The drive member 50 is configured as the output of the isolated drive assembly 10 in the example provided, but it will be appreciated that an isolated drive assembly 10 constructed in accordance with the teachings of the present disclosure could employ the drive member 50 as the input to the isolated drive assembly 10. In the example shown, the drive member 50 has a drive element 70, an inner drive member wall 72, and a support wall 74. The drive element 70 extends circumferentially about a rotational axis 80 and has a first outer circumferential surface 82 and a first inner circumferential surface 84. As the drive element 70 is a pulley sheave, the first outer circumferential surface 82 can be configured to engage the drive belt 20. The inner drive member wall 72 can extend circumferentially about the rotational axis 80 concentric with the drive element 70. The inner drive member wall 72 can have a second outer circumferential surface 92 and a second inner circumferential surface 94. The second inner circumferential surface 94 can define a drive member hub aperture 96. The support wall 74 can extending radially between and can rotationally couple the drive element 70 and the inner drive member wall 72. Accordingly, the drive element 70 can be formed as an annular channel where the drive element 70 and the inner drive member wall 72 are concentric walls that are spaced apart from and coupled to one another by the support wall 74.

The drive member hub 52 is configured to be coupled to the crankshaft 40 for rotation therewith. The drive member hub 52 can have a cup-like shape with an annular hub wall 100 and a hub end wall 102. The annular hub wall 100 is sized to be received into the drive member hub aperture 96 in the drive member 50 so that the drive member 50 is rotatable about the rotational axis 80 relative to the drive member hub 52. If desired, a seal can be disposed between the drive member hub 52 and the drive member 50. In the example provided, the annular hub wall 100 defines a seal groove 106 into which a seal 108 is received. The seal 108 sealingly engages an exterior circumferential surface of the annular hub wall 100 and the second inner circumferential surface 94 on the inner drive member wall 72. The hub end wall 102 can span radially across an axial end of the annular hub wall 100. One or more fastener apertures 110 can be formed through the hub end wall 102 and associated threaded fasteners 112 can be received through the fastener apertures 110 to secure the drive member hub 52 to the crankshaft 40.

The isolator assembly 54 can have an isolator hub 120, an isolator rim 122 and an elastomeric element 124. The isolator hub 120 is coupled to the drive member hub 52 for rotation therewith about the rotational axis 80. The isolator rim 122 is coupled to the drive member 50 for rotation therewith about the rotational axis 80. The elastomeric element 124 resiliently couples the isolator hub 120 and the isolator rim 122. The elastomeric element 124 can be formed of any desired elastomer, such as ethylene propylene diene monomer (EDPM) rubber. However, silicone rubber is the presently preferred material for the elastomeric element 124.

In the specific example provided, the isolator hub 120 includes a hub portion 130, which spans across the inner drive member wall 72 of the drive element 70, an isolator mount 132, which has a tubular shape that extends axially along the rotational axis 80 from a radially outer end of the hub portion 130, and a flange member 134 that extends radially outwardly from the isolator mount 132 on an axial end of the isolator mount 132 that is opposite the hub portion 130. A plurality of fastener apertures 136 are formed through the hub portion 130 and are aligned to the fastener apertures 110 formed in the drive member hub 52. The isolator rim 122 is a tubular segment. The elastomeric element 124 is bonded to the exterior circumferential surface of the isolator mount 132 and to the interior circumferential surface of the isolator rim 122. The exterior circumferential surface of the isolator rim 122 can be fixedly coupled to the first inner circumferential surface 84 of the drive element 70, for example via press-fitting. With the configuration shown, a portion of the isolator assembly 54 that includes the elastomeric element 124 is disposed in the annular channel that is formed by the drive element 70.

A bearing 140 can be disposed between the drive member 50 and the isolator hub 120. In the example shown, the bearing 140 comprises a tubular bearing portion 142, which is received onto the second outer circumferential surface 92 of the inner drive member wall 72 as well as the inner circumferential surface of the isolator mount 132, and a bearing flange 144 that is disposed axially between the support wall 74 on the drive member 50 and the flange member 134 on the isolator hub 120.

It will be appreciated that the isolator assembly 54 could be configured somewhat differently and could be connected to the drive element 70 in a different manner. For example, the isolator assembly 54 could be configured so that the isolator rim 122 is disposed radially inwardly of the isolator mount 132, the isolator rim 122 is fixedly mounted to the inner drive member wall 72 and the tubular bearing portion 142 of the bearing 140 engages the first inner circumferential surface 84 on the drive element 70.

The torque limiter 56 is configured to limit relative rotation between the drive member 50 and the drive member hub 52 in a first rotational direction to prevent the elastomeric element 124 from being subjected to a torque that is directed in the first rotational direction and which exceeds a first predetermined magnitude, and to limit relative rotation between the drive member 50 and the drive member hub 52 in a second rotational direction that is opposite the first rotational direction to prevent the elastomeric element 124 from being subjected to a moment that is directed in the second rotational direction and which exceeds a second predetermined magnitude. The torque limiter 56 is preferably disposed in a chamber that is protected from dirt and debris. In the example provided, the torque limiter 56 is disposed in a chamber that is delimited by the bearing 140, the isolator hub 124, the drive member hub 52, the seal 108, and the inner drive member wall 72 of the drive member 50.

Figure 5:
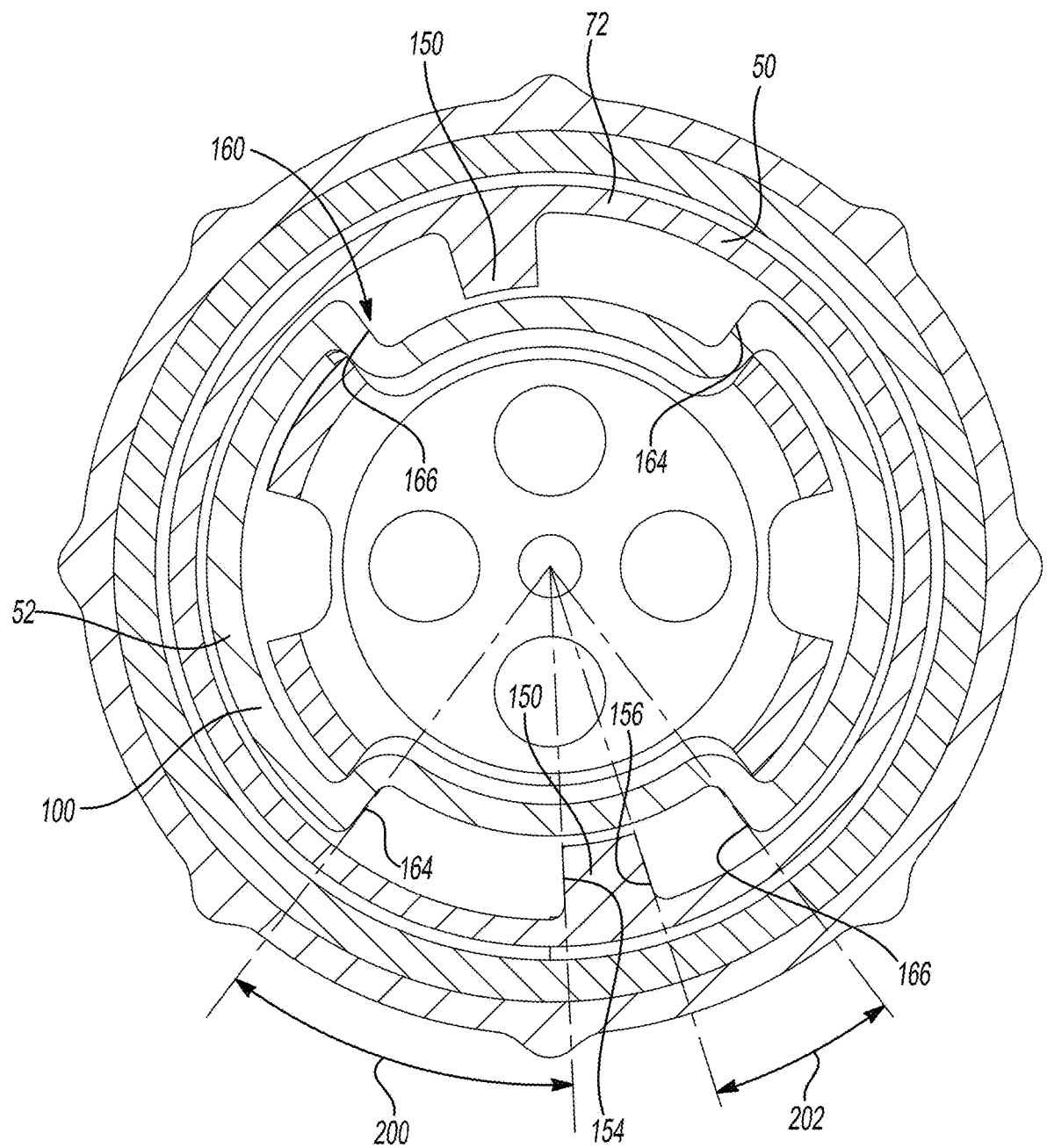
FIG. 5 is a section view taken along the line 5-5 of FIG. 3.

With reference to FIGS. 3 and 5, the torque limiter 56 can include one or more teeth 150, which can be coupled for rotation with one of the drive member 50 and the drive member hub 52, and a corresponding set of drive elements 152, that can be coupled to the other one of the drive member 50 and the drive member hub 52. In the example provided, the teeth 150 are coupled for rotation with the drive member 50 and extend radially inwardly from the inner drive member wall 72. Each of the teeth 150 has a first tooth face 154 and a second tooth face 156. The drive member hub 52 defines a plurality of groove 160, which are formed into the annular hub wall 100 and which can define the drive elements 152. Each of the groove 160 has first and second sidewalls 164 and 166, respectively, that are spaced circumferentially apart from one another. The first and second sidewalls 164 and 166 comprise the set of drive elements that are rotatably coupled to the drive member hub 52. Each of the teeth 150 is received into an associated one of the grooves 160. Rotation of the drive member 50 about the rotational axis 80 relative to the drive member hub 52 in the first rotational direction is limited by contact between the first tooth faces 154 and the first sidewalls 164, while rotation of the drive member 50 about the rotational axis 80 in the second rotational direction is limited by contact between the second tooth faces 156 and the second sidewalls 166.

Returning to FIGS. 3 and 4, the torsional vibration damper 58 can be configured to damp vibration at a predetermined frequency that is generated by the internal combustion engine 14 (FIG. 1) during its operation. The torsional vibration damper 58 can be any type of torsional vibration damper, such as a viscous damper or a tuned rubber damper that employs one or more springs and an inertia ring. In the particular example provided, the torsional vibration damper 58 is a conventional viscous damper with a damper hub 170 having fastener apertures 172 formed therethrough and which are aligned to the fastener apertures 110 and 136 formed in the drive member hub 52 and the hub portion 130 of the isolator hub 120.

The seal flange 60 can be configured to adapt the drive member hub 52, the isolator hub 120, and if included, the damper hub 170 of the torsional vibration damper 58 to the crankshaft 40 in a manner that positions the drive member 50 at a desired location along the rotational axis 80 relative to the pulleys 22 (FIG. 1) of the FEAD 12 (FIG. 1), as well as maintains the rotational axis 80 coincident with a rotary axis of the crankshaft 40. The seal flange 60 can include a crankshaft pilot portion 180, which is formed in a first axial end of the seal flange 60 and which is configured to pilot onto a portion of the crankshaft 40 to align the rotational axes of the seal flange 60 and the crankshaft 40 to one another, and a cylindrical projection 182 that extends from a second, opposite axial end of the seal flange and which is configured to be received into through-holes formed through the drive member hub 52, the isolator hub 120 and the damper hub 170 as shown in FIG. 3 to align the rotational axis 80 to the rotational axis of the seal flange 60. The cylindrical projection 182 can be sized to provide a light press-fit with the through-hole formed in the drive member hub 52 so that engagement of the cylindrical projection 182 to the drive member hub 52 axially retains the components of the isolated drive assembly 10 to one another prior to the installation of the isolated drive assembly 10 to the crankshaft 40. A plurality of fastener apertures 186 can be formed axially through the seal flange 60. The threaded fasteners 112 can be received through the fastener apertures 110, 136, 172 and 186 in the drive member hub 52, the isolator hub 120, the damper hub 170, and the seal flange 60 and threaded into corresponding threaded holes 188 in the crankshaft 40 to fixedly couple the isolated drive assembly 10 to the crankshaft 40. Optionally, a washer 190 can be disposed between the heads 192 of the threaded fasteners 112 and the hub end wall 102 of the drive member hub 52. Also optionally, the seal flange 60 may also include a circumferentially extending seal surface 196 that is configured to be engaged by a dynamic seal (not shown) that is housed in a component of the internal combustion engine 14 (FIG. 1). The dynamic seal may be mounted to a front cover (not shown) of the internal combustion engine 14 (FIG. 1) and can include one or more seal lips (not shown) that can be sealingly engaged to the circumferentially extending seal surface 196.

With reference to FIGS. 3 and 5, the torque limiter 56 is disposed in an initial position (shown in FIG. 5) when no power is transmitted through the isolated drive assembly 10. In the initial position, the first tooth face 154 is spaced from the first sidewall 164 by a first angle 200, and the second tooth face 156 is spaced from the second sidewall 166 by a second angle 202.

When the internal combustion engine 14 (FIG. 1) is operated to drive the drive belt 20 of the FEAD 12 (FIG. 1), the angular spacing between the first tooth face 154 and the first sidewall 164 will diminish as more torque is required to drive the accessories. In situations where the load created by the accessories is relatively high and the load on one or more of the accessories increases suddenly, for example through the switching on of an air conditioning compressor or the placement of a sudden demand for high current electrical power on the alternator, the torque required to drive the accessories may be equal to a first predetermined threshold. In such situations, a first set of engageable torque limiter elements can engage one another to limit rotation of the drive member 50 relative to the drive member hub 52 in the first rotational direction to prevent the elastomeric element 124 from being subjected to a first moment that is directed in the first rotational direction and which exceeds a first predetermined magnitude. In this regard, the amount of torque that is needed to drive the accessories that exceeds the magnitude of the first moment is transmitted from the drive member 50 through the first set of engageable torque limiter elements (i.e., the first tooth face 154 and the first sidewall 164 in the example provided) to the drive member hub 52.

At times during the operation of the internal combustion engine 14 (FIG. 1) and the FEAD 12 (FIG. 1), there will be times where the rotational inertia of one or more of the accessories will tend to drive the drive belt 20 of the FEAD 12 (FIG. 1) so that load is effectively removed from the drive member 50 and the elastomeric element 124. In such situations, the angular spacing between the first tooth face 154 and the first sidewall 164 will decrease as less torque is required to drive the accessories. In some cases, the rotational inertia of the high-rotational inertia accessory or accessories is sufficient to drive the drive member 50 in the second rotational direction relative to the drive member hub 52 away from the initial position (i.e., the position where no moment is transmitted through the elastomeric element 124) so that the angular spacing between the second tooth face 156 and the second sidewall 166 decreases.

A second set of torque limiter elements can engage one another to limit the transmission of power through the elastomeric element 124 in the second rotational direction in situations where one or more of the accessories would tend to back-drive the crankshaft 40. In such situations, a second set of engageable torque limiter elements can engage one another to limit rotation of the drive member 50 relative to the drive member hub 52 in the second rotational direction to prevent the elastomeric element 124 from being subjected to a second moment that is directed in the second rotational direction and which exceeds a second predetermined magnitude. In this regard, the amount of torque that is applied to the drive member 50 through the drive belt 20 from the accessories that exceeds the magnitude of the second moment is transmitted from the drive member 50 through the second set of engageable torque limiter elements (i.e., the second tooth face 156 and the second sidewall 166 in the example provided) to the drive member hub 52.

It will be appreciated that the magnitudes of the first and second moments can be set to desired levels and that the two magnitudes need not be equal. For example, the magnitude of the first moment can be larger than the magnitude of the second moment. As such, the magnitude of the first angle 200 can be larger than the magnitude of the second angle 202. Preferably, the magnitude of the first angle 200 is about 1.5 to 2.5 times the magnitude of the second angle 202. More preferably, the magnitude of the first angle 200 is about twice as large as the magnitude of the second angle 202. In the example provided, the first angle 200 has a magnitude of about 40 degrees and the second angle 202 has a magnitude of about 20 degrees.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An isolated drive assembly comprising:
a drive member that is rotatable about a rotational axis and which defines a drive member hub aperture;
a drive member hub received in the drive member hub aperture, the drive member hub being rotatable about the rotational axis relative to the drive member; and
an isolator assembly having an isolator hub, an isolator rim and an elastomeric element, the isolator hub being coupled to the drive member hub for rotation therewith about the rotational axis, the isolator rim being coupled to the drive member for rotation therewith about the rotational axis, the elastomeric element resiliently coupling the isolator hub and the isolator rim;
wherein one of the drive member and the drive member hub defines a plurality of circumferentially spaced apart teeth, each of the teeth having first and second tooth faces;
wherein the other one of the drive member and the drive member hub defines a plurality of grooves, each of the grooves being at least partly delimited on their opposite circumferential ends by first and second sidewalls formed on the other one of the drive member and the drive member hub, wherein each of the teeth is disposed in an associated one of the grooves and is located within the associated one of the grooves at an initial position when no torque is transmitted between the isolator assembly and the drive member, wherein contact between the first tooth faces of the teeth and the first sidewalls limits rotation of the drive member relative to the drive member hub away from the initial position in a first rotational direction, and wherein contact between the second tooth faces of the teeth and the second sidewalls limits rotation of the drive member relative to the drive member hub away from the initial position in a second rotational direction that is opposite the first rotational direction;

wherein the drive member rotates relative to the drive member hub through a first angle between the initial position and a location where one of the first tooth faces abuts a corresponding one of the first sidewalls, wherein the drive member rotates relative to the drive member hub through a second angle between the initial position and a location where one of the second tooth faces abuts a corresponding one of the second sidewalls, and wherein a magnitude of the first angle is greater than a magnitude of the second angle.

2. The isolated drive assembly of claim 1, wherein the elastomeric element is formed of silicone rubber.

3. The isolated drive assembly of claim 1, further comprising a damper coupled to the drive member hub for rotation therewith.

4. The isolated drive assembly of claim 1, wherein the damper is a viscous damper or a rubber damper.

5. The isolated drive assembly of claim 1, wherein the first magnitude is 1.5 to 2.5 times the second magnitude.

6. The isolated drive assembly of claim 5, wherein the first magnitude is about 40 degrees and the second magnitude is about 20 degrees.

7. The isolated drive assembly of claim 1, wherein the drive member has a drive element, an inner drive member wall, and a support wall, the drive element extending circumferentially about the rotational axis and having a first inner circumferential surface, the inner drive member wall extending circumferentially about the rotational axis and being concentric with the drive element, the inner drive member wall having a second inner circumferential surface that defines the drive member hub aperture, the support wall extending radially between and rotationally coupling the drive element and the inner drive member wall, wherein the isolator rim is mounted to one of the drive element and the inner drive member wall.

8. The isolated drive assembly of claim 1, wherein a seal is disposed between the drive member and the drive member hub.

9. The isolated drive assembly of claim 1, further comprising a bearing disposed radially between the isolator assembly and the drive member, the bearing supporting relative rotation between the isolator hub and the drive member.

10. The isolated drive assembly of claim 9, wherein a portion of the bearing is disposed axially between the drive member and the isolator hub.

11. The isolated drive assembly of claim 1, wherein the drive member is a pulley sheave.

12. An isolated drive assembly comprising:
a drive member that is rotatable about a rotational axis and which defines a drive member hub aperture;
a drive member hub received in the drive member hub aperture, the drive member hub being rotatable about the rotational axis relative to the drive member; and
an isolator assembly having an isolator hub, an isolator rim and an elastomeric element, the isolator hub being coupled to the drive member hub for rotation therewith about the rotational axis, the isolator rim being coupled to the drive member for rotation therewith about the rotational axis, the elastomeric element resiliently coupling the isolator hub and the isolator rim;

wherein one of the drive member and the drive member hub defines a plurality of circumferentially spaced apart teeth, each of the teeth having first and second tooth faces;
wherein the other one of the drive member and the drive member hub defines a plurality of grooves, each of the grooves being at least partly delimited on their opposite circumferential ends by first and second sidewalls formed on the other one of the drive member and the drive member hub, wherein each of the teeth is disposed in an associated one of the grooves and is located within the associated one of the grooves at an initial position when no torque is transmitted between the isolator assembly and the drive member, wherein contact between the first tooth faces of the teeth and the first sidewalls limits rotation of the drive member relative to the drive member hub away from the initial position in a first rotational direction, and wherein contact between the second tooth faces of the teeth and the second sidewalls limits rotation of the drive member relative to the drive member hub away from the initial position in a second rotational direction that is opposite the first rotational direction;

wherein the drive member has a drive element, an inner drive member wall, and a support wall, the drive element extending circumferentially about the rotational axis and having a first inner circumferential surface, the inner drive member wall extending circumferentially about the rotational axis and being concentric with the drive element, the inner drive member wall having a second inner circumferential surface that defines the drive member hub aperture, the support wall extending radially between and rotationally coupling the drive element and the inner drive member wall, wherein the isolator rim is mounted to one of the drive element and the inner drive member wall; and wherein the isolator rim is mounted on the first inner circumferential surface on the drive element, and wherein a portion of the isolator hub is received into an annular channel that is formed by the drive element, the inner drive member wall and the support wall.

13. An isolated drive assembly comprising:
a drive member that is rotatable about a rotational axis, the drive member having a drive member hub aperture;
a drive member hub received in the drive member hub aperture, the drive member hub being rotatable about the rotational axis relative to the drive member;
an isolator assembly having isolator hub, an isolator rim and a silicone rubber element, the isolator hub being coupled to the drive member hub for rotation therewith about the rotational axis, the isolator rim being coupled to the drive member for rotation therewith about the rotational axis, the silicone rubber element resiliently coupling the isolator hub and the isolator rim;
a torque limiter having a first limiter element, which is coupled to the drive member for rotation therewith, and a second limiter element that is coupled to the drive member hub for rotation therewith, wherein relative rotation between the drive member and the drive member hub in a first rotational direction in response to transmission of a first moment between the drive member and the drive member hub in the first rotational direction that is greater than or equal to a first predetermined magnitude is limited by contact between a first portion of the first limiter element and a first portion of the second limiter element when a first moment is transmitted, and wherein relative rotation between the drive member and the drive member hub in a second, opposite rotational direction in response to transmission of a second moment between the drive member and the drive member hub in the second rotational direction that is greater than or equal to a second predetermined magnitude is limited by contact between a second portion of the first limiter element and a second portion of the second limiter element, and wherein the first and second limiter elements are not in contact with one another when rotary power is not transmitted through the silicone rubber element;

a seal that sealingly engages the drive member and the drive member hub; and a bearing disposed radially between the isolator assembly and the drive member, the bearing supporting relative rotation between the isolator hub and the drive member;

wherein the drive member has an inner drive member wall that extends circumferentially about the rotational axis, wherein the inner drive member wall defines the drive member hub aperture, and wherein the first and second limiter elements are disposed in a chamber that is delimited by the bearing, the isolator hub, the drive member hub, the seal, and the inner drive member wall.

14. The isolated drive assembly of claim 13, wherein the drive member is a pulley sheave.

15. The isolated drive assembly of claim 12, wherein the drive member is a pulley sheave.

16. The isolated drive assembly of claim 13, wherein the first portion of one of the first limiter element and the second limiter element comprises a first tooth face, and wherein the first portion of the other one of the first limiter element and the second limiter element comprises a first sidewall.

17. The isolated drive assembly of claim 16, wherein the second portion of the one of the first limiter element and the second limiter element comprises a second tooth face, and wherein the second portion of the other one of the first limiter element and the second limiter element comprises a second sidewall.

* * * * *